United States Patent
Fukuda et al.

(10) Patent No.: US 11,580,481 B2
(45) Date of Patent: Feb. 14, 2023

(54) PRODUCTION MANAGEMENT SUPPORT SYSTEM AND PRODUCTION MANAGEMENT SUPPORT METHOD THAT AUTOMATICALLY DETERMINE LOSS FACTORS

(71) Applicant: Hitachi, Ltd., Tokyo (JP)

(72) Inventors: Satoshi Fukuda, Tokyo (JP); Keita Nogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 111 days.

(21) Appl. No.: 17/132,400

(22) Filed: Dec. 23, 2020

(65) Prior Publication Data

US 2021/0374647 A1 Dec. 2, 2021

(30) Foreign Application Priority Data

May 29, 2020 (JP) .............................. JP2020-093826

(51) Int. Cl.
*G06Q 10/06* (2012.01)
*G06Q 10/0639* (2023.01)
*G06Q 10/0637* (2023.01)

(52) U.S. Cl.
CPC ... *G06Q 10/06395* (2013.01); *G06Q 10/0637* (2013.01); *G06Q 10/06393* (2013.01)

(58) Field of Classification Search
None
See application file for complete search history.

(56) References Cited

U.S. PATENT DOCUMENTS

2014/0297374 A1* 10/2014 Ikezawa ........... G06Q 10/06395 705/7.41
2018/0259944 A1* 9/2018 Oka .................... G05B 19/418
(Continued)

FOREIGN PATENT DOCUMENTS

JP 6540481 B2 7/2019
JP 2019-153051 A 9/2019
(Continued)

OTHER PUBLICATIONS

Amir Hamzah Abdul Rasib, et al, "Critical Factors for Product Change Time Loss in Manufacturing Operation," Dec. 2019, International Symposium on Research in Innovation and Sustainability, p. 1-5 (Year: 2019).*

(Continued)

*Primary Examiner* — Amanda Gurski
(74) *Attorney, Agent, or Firm* — Mattingly & Malur, PC

(57) ABSTRACT

A system performs a loss factor determination which refers to, for each of two or more different Ms from among 4 Ms (Man, Machine, Material, and Method), a time series data group representing a time series of a state of an element belonging to the M, and which determines, for each period between time points, whether or not a state combination in the same period between time points corresponds to one or a plurality of loss state combinations. In each period between time points, the state combination is a combination of two or more states belonging to the period between time points and corresponding to the two or more Ms. The loss state combination is a state combination defined as an opportunity loss. With each loss state combination, a loss factor, which is a factor of an opportunity loss corresponding to the loss state combination, is associated.

8 Claims, 11 Drawing Sheets

Loss Factor Rule Table
300

| # | Man | Machine | Material | Method | Loss Factor |
|---|---|---|---|---|---|
| 1 | Shortage | Stopped | - | - | Worker Shortage |
| 2 | - | Stopped | Shortage | - | Waiting For Workpiece |
| 3 | - | Stopped | - | Shortage | Waiting For Tool |
| 4 | - | Operated | | | Performance Abnormality |
| 5 | - | Stopped | Shortage | Shortage | Impossible To Be Determined |
| ... | ... | ... | ... | ... | ... |

(56) References Cited

U.S. PATENT DOCUMENTS

2019/0271969 A1* 9/2019 Miyamoto ....... G05B 19/41865
2019/0327444 A1* 10/2019 Kim ....................... G06V 20/46
2021/0141366 A1* 5/2021 Yamaguchi ........ G05B 19/4183
2022/0137609 A1* 5/2022 Tsutsumi ............. G06Q 10/063
　　　　　　　　　　　　　　　　　　　　　　　700/96

FOREIGN PATENT DOCUMENTS

| JP | 2020-057091 A | | 4/2020 |
| JP | 2021196981 A | * | 12/2021 |
| KR | 10-2013-0016857 A | | 2/2013 |
| KR | 10-2019-0088581 A | | 7/2019 |
| WO | 2020/090715 A1 | | 5/2020 |

OTHER PUBLICATIONS

Japanese Office Action received in corresponding Japanese Application No. 2020-093826 dated Jan. 11, 2022.

* cited by examiner

FIG. 3

Loss Factor Rule Table
300

| # | Man | Machine | Material | Method | Loss Factor |
|---|---|---|---|---|---|
| 1 | Shortage | Stopped | - | - | Worker Shortage |
| 2 | - | Stopped | Shortage | - | Waiting For Workpiece |
| 3 | - | Stopped | - | Shortage | Waiting For Tool |
| 4 | - | Operated |  |  | Performance Abnormality |
| 5 | - | Stopped | Shortage | Shortage | Impossible To Be Determined |
| ... | ... | ... | ... | ... | ... |

FIG. 4

4-M Time Series Table
400

| # | Time Point | Category Classification | Element Name | State |
|---|---|---|---|---|
| 1 | April 1, 09:00 | Man | Worker 5 | Shortage |
| 2 | April 1, 09:00 | Machine | Machine 1 | Stopped |
| 3 | April 1, 09:00 | Material | Workpiece 1 | Sufficient |
| 4 | April 1, 09:00 | Method | Tool 1 | State Undetermined |
| 5 | April 1, 09:01 | Man | Worker 5 | Shortage |
| ... | ... | ... | ... | ... |

FIG. 5

Loss Factor Registration Table
500

| # | Time Point | Loss Factor | Loss Factor Detail |
|---|---|---|---|
| 1 | April 1, 09:00 | Worker Shortage | Waiting For Chips To Be Cleared |
| 2 | April 1, 09:01 | Worker Shortage | Waiting For Chips To Be Cleared |
| 3 | April 1, 09:02 | Worker Shortage | Waiting For Chips To Be Cleared |
| 4 | April 1, 09:03 | Worker Shortage | Waiting For Chips To Be Cleared |
| 5 | April 1, 09:04 | - | - |
| 6 | April 1, 09:05 | - | - |
| ... | ... | ... | ... |

FIG. 6

Video Management Table
600

| # | File Name | Camera Name | Start Time Point | End Time Point |
|---|---|---|---|---|
| 1 | Movie-A001 | Camera-A | April 1, 09:00 | April 1, 09:05 |
| 2 | Movie-A002 | Camera-A | April 1, 09:05 | April 1, 09:10 |
| ... | ... | ... | ... | ... |

FIG. 7

Area Management Table
700

| # | Area Name | Element Name | Classification |
|---|---|---|---|
| 1 | Area-A | Camera-A | Camera |
| 2 | Area-A | Worker 5 | Man |
| ... | ... | ... | ... |

FIG. 9

Subsequent Combination Table
900

| # | Event Occurrence Period Between Time Points | | | | Subsequent Period Between Time Points | | | | Loss Factor |
|---|---|---|---|---|---|---|---|---|---|
|   | Man | Machine | Material | Method | Man | Machine | Material | Method |   |
| 1 | - | Stopped | Shortage | Shortage | - | Operated | Shortage | Sufficient | Tool Shortage |
| 2 | - | Stopped | Shortage | Shortage | - | Operated | Sufficient | Shortage | Waiting For Workpiece |
| 3 | Shortage | Stopped | Shortage | - | Sufficient | Operated | Shortage | - | Worker Shortage |
| ⋮ | ⋮ | ⋮ | ⋮ | ⋮ | ⋮ | ⋮ | ⋮ | ⋮ | ⋮ |

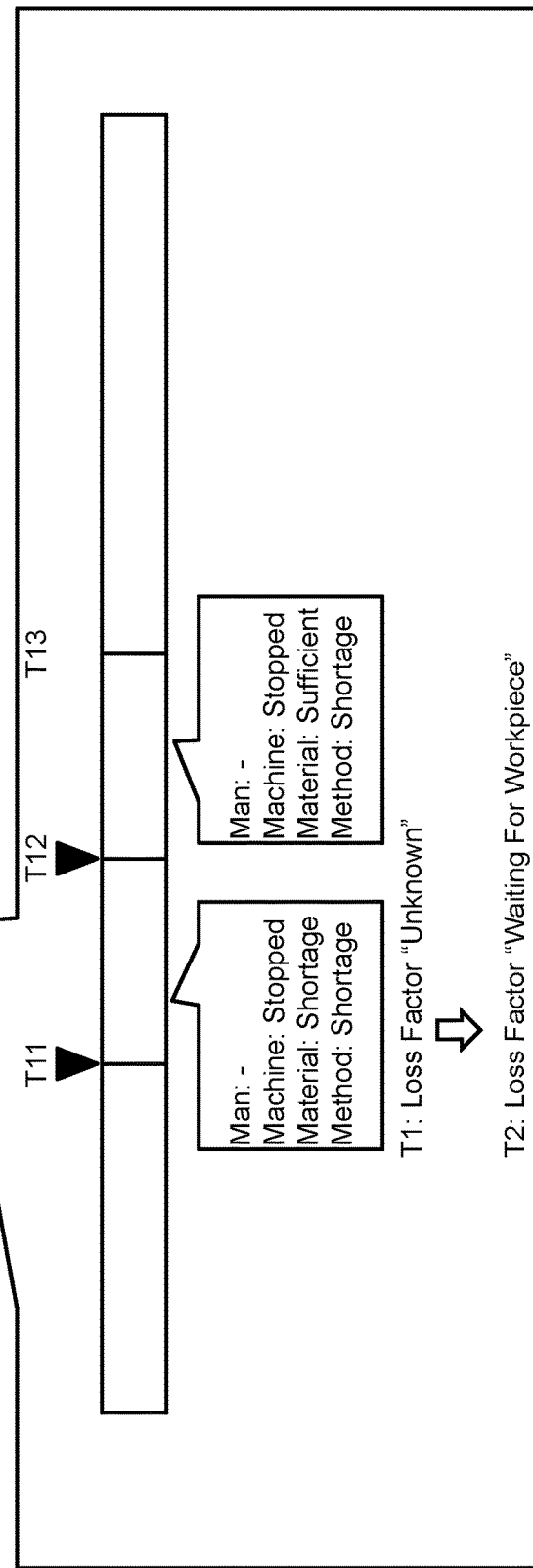

T11 — Man: -, Machine: Stopped, Material: Shortage, Method: Shortage

T12 — Man: -, Machine: Stopped, Material: Sufficient, Method: Shortage

T13

T1: Loss Factor "Unknown" ⇒ T2: Loss Factor "Waiting For Workpiece"

PRODUCTION MANAGEMENT SUPPORT SYSTEM AND PRODUCTION MANAGEMENT SUPPORT METHOD THAT AUTOMATICALLY DETERMINE LOSS FACTORS

CROSS-REFERENCE TO PRIOR APPLICATION

This application relates to and claims the benefit of priority from Japanese Patent Application number 2020-93826, filed on May 29, 2020 the entire disclosure of which is incorporated herein by reference.

BACKGROUND

The present invention generally relates to a computer technique for support of production management.

Techniques relating to support of production management include, e.g., a management system disclosed in PTL 1, i.e., Japanese Patent Specification No. 6540481. In the management system disclosed in PTL 1, in a case where the occurrence of a specific event is detected based on state information obtained from production equipment, i.e., a management target, a possibility that a factor, which belong to an M from among 4 Ms (Machine, Man, Material, and Method), has caused the specific event is output.

[PTL 1] Japanese Patent Specification No. 6540481

SUMMARY

One of the purposes of production management is an improvement in productivity. One of methods for improving productivity is a reduction in opportunity loss. "The opportunity loss" means that an outcome that could have been produced originally is not obtained. Hereinafter, the opportunity loss is simply referred to as "a loss".

In order to reduce the loss, it is necessary to accurately determine the occurrence of the loss that has to be reduced and a factor of the loss.

However, even when the technique disclosed in PTL 1, is used, it is difficult to accurately determine the occurrence of the loss and the factor of the loss. For example, since a state information is obtained from production equipment, it is possible to determine, from the state information, the occurrence of the stop in the production equipment to be the occurrence of the loss. However, it is difficult to accurately determine the factor of the stop. In addition, according to PTL 1, the presence or absence of occurrence of the event is determined based on the state information. However, since the state information is information obtained only from the production equipment belonging to Machine, it is difficult to determine the occurrence of the loss caused by an element belonging to at least one M, other than Machine, as the factor.

A system performs a loss factor determination which refers to, for each of two or more different Ms from among 4 Ms (Man, Machine, Material, and Method), a time series data group representing a time series of a state of an element belonging to the M, and which determines, for each period between time points, whether or not a state combination in the same period between time points corresponds to one or a plurality of loss state combinations. In each period between time points, the state combination is a combination of two or more states belonging to the period between time points and corresponding to the two or more Ms. The loss state combination is a state combination defined as a loss. With each loss state combination, a loss factor, which is a factor of a loss corresponding to the loss state combination, is associated. The system displays the loss factor on the basis of a result of the loss factor determination in chronological order.

According to the present invention, it is possible to improve accuracy in determination of the occurrence of a loss and the factor of the loss.

BRIEF DESCRIPTION OF THE DRAWINGS

FIG. 3 shows an example of the configuration of a loss factor rule table;

FIG. 4 shows an example of the configuration of a 4-M time series table;

FIG. 5 shows an example of the configuration of a loss factor registration table;

FIG. 6 shows an example of the configuration of a video management table;

FIG. 7 shows an example of the configuration of an area management table;

FIG. 9 shows an example of the configuration of a subsequent combination table;

DESCRIPTION OF EMBODIMENTS

Figure 1:
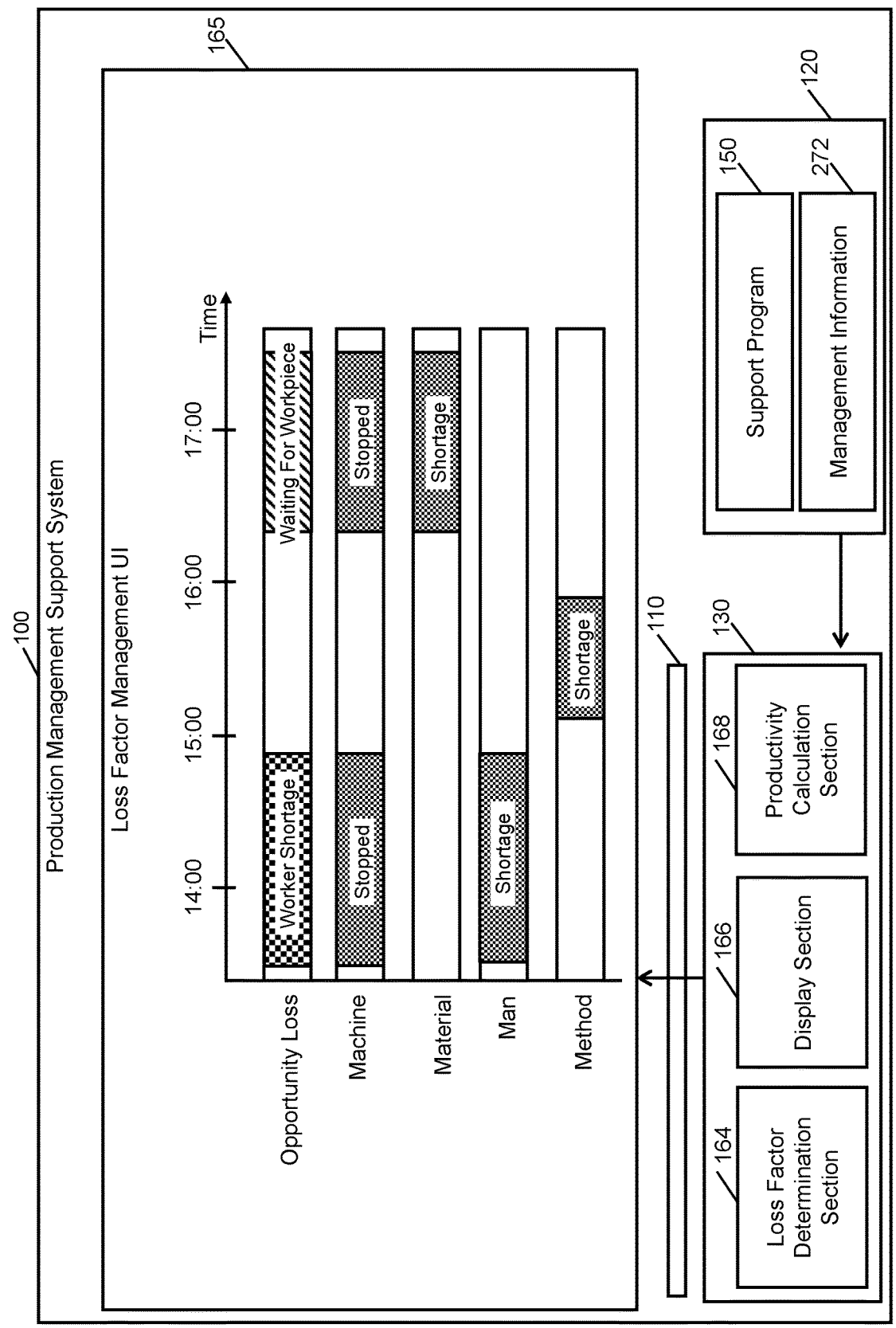
FIG. 1 shows the outline of an embodiment.

In the following description, "an interface apparatus" may be one or more interface devices. The one or more interface devices may be at least one of the following.

One or more input/output (I/O) interface devices. The input/output (I/O) interface device is an interface device for at least one of an I/O device and a remote display computer. The I/O interface device for the display computer may be a communication interface device. At least one I/O device may be any of user interface devices such as, e.g., an input device such as a keyboard and a pointing device, and an output device such as a display device.

One or more communication interface devices. One or more communication interface devices may be one or more communication interface devices of the same type (e.g., one or more network interface cards (NIC)), or may also be communication interface devices of two or more different types (e.g., the NIC and a host bus adapter (HBA)).

In addition, in the following description, "a memory" may be one or more memory devices which are examples of one or more storage devices, and may be typically a main storage device. At least one memory device in the memory may be a volatile memory device or may also be a non-volatile memory device.

Further, in the following description, "a persistent storage apparatus" may be one or more persistent storage devices which are examples of one or more storage devices. The persistent storage device may be typically a non-volatile storage device (e.g., an auxiliary storage device) and, specifically, the persistent storage device may be, e.g., a hard disk drive (HDD), a solid state drive (SSD), a non-volatile memory express (NVME) drive, or a storage class memory (SCM).

In addition, in the following description, "a storage apparatus" may be, of the memory and the persistent storage apparatus, at least the memory.

Further, in the following description, "a processor" may be one or more processor devices. At least one processor device may be typically a microprocessor device such as a central processing unit (CPU), and may also be a processor device of another type such as a graphics processing unit (GPU). At least one processor device may be a single-core processor device or may also be a multi-core processor device. At least one processor device may be a processor core. At least one processor device may be a processor device in a broad sense such as a circuit including an aggregate of gate arrays which is written in a hardware description language and performs part or all of processing (e.g., a field-programmable gate array (FPGA), a complex programmable logic device (CPLD), or an application specific integrated circuit (ASIC)).

In addition, in the following description, while function is sometimes described by using an expression "yyy section", the function may be implemented by executing one or more computer programs with a processor, may be implemented by one or more hardware circuits (e.g., the FPGA or the ASIC), or may also be implemented by a combination thereof. In the case where the function is implemented by executing the programs with the processor, predetermined processing is performed while a storage apparatus and/or an interface apparatus is appropriately used, and hence the function may be at least part of the processor. Processing described by using the function as the subject may be processing performed by the processor or an apparatus having the processor. The program may be installed from a program source. The program source may be, e.g., a program distribution computer, or a recording medium (e.g., a non-transitory recording medium) which can be read by a computer. The description of each function is illustrative, and a plurality of functions may be integrated into one function or one function may be divided into a plurality of functions.

Further, in the following description, while there are cases where processing is described by using "a program" as the subject, the processing described by using the program as the subject may be processing performed by a processor or an apparatus having the processor. In addition, two or more programs may be implemented as one program, or one program may be implemented as two or more programs.

Further, in the following description, while information which allows obtainment of output to input is sometimes described by using an expression "xxx table", the information may be a table having any structure, and may also be a learning model represented by a neural network, genetic algorithm, or random forest which generates output to input. Consequently, "xxx table" can be referred to as "xxx information". In addition, in the following description, the configuration of each table is illustrative, and one table may be divided into two or more tables or all or part of two or more tables may be one table.

Further, in the following description, "a production management support system" may be a system constituted by one or more physical computers, or may also be a system implemented on a physical calculation resource group (e.g., the structure of cloud computing) (e.g., a cloud computing system). "Displaying" of display information by the production management support system may be displaying of the display information in a display device of a computer, and may also be transmitting of the display information to a display computer by the computer (in the case of the latter, the display information is displayed by the display computer).

FIG. 1 shows the outline of an embodiment. Note that, in the following description, "UI" is an abbreviation of user interface, and is typically a graphical user interface (GUI).

A production management support system 100 has an interface apparatus 110, a storage apparatus 120, and a processor 130 coupled to the interface apparatus 110 and the storage apparatus 120.

The storage apparatus 120 stores management information 272 and a support program 150. The management information 272 is management information related to support of production management. The support program 150 is a computer program for the support of the production management.

The support program 150 is executed by the processor 130, and a loss factor determination section 164, a display section 166, and a productivity calculation section 168 are thereby implemented.

The loss factor determination section 164 refers to a time series data group in the management information 272. The time series data group includes, for each of 4 Ms (Man, Machine, Material, and Method), data on a time series of a state of an element belonging to the M. The loss factor determination section 164 performs a loss factor determination which determines, for each period between time points, whether or not a state combination in the same period between time points corresponds to one or a plurality of loss state combinations based on the time series data group. In each period between time points, the state combination is a combination of four states which belong to the period between time points and correspond to 4 Ms. The loss state combination is a state combination defined as a loss (opportunity loss). With each loss state combination, for example, the name of a loss factor which is a factor in a loss corresponding to the loss state combination is associated.

The display section 166 displays the loss factor based on the result of the loss factor determination in chronological order. Specifically, for example, the display section 166 displays a loss factor management UI 165 based on the result of the loss factor determination. The loss factor management UI 165 displays a state time series (a time series of the state of each of 4 Ms) based on the time series data group, and a loss factor time series (a time series of the loss factor) based on the result of the loss factor determination according to the same time axis.

According to the present embodiment, instead of determining whether or not the loss has occurred individually from the state of each of 4 Ms (or in addition to such a determination), it is determined, for each period between time points, whether or not the loss has occurred from the state combination (the combination of four states corresponding to 4 Ms) in the period between time points. That is, the combination of the states of 4 Ms is checked. When the loss state combination defined as the loss is found, the loss factor associated with the loss state combination is identified. Thus, it is possible to improve accuracy in the determination of the occurrence of the loss and the factor in the loss. According to an example shown in FIG. 1, a time block in which the state of Machine is "stopped" can correspond to the time block of the loss. However, several factors in the loss are conceivable, and it is not possible to accurately determine (e.g., narrow down) the loss factor only from the time series data of the state of Machine. To cope with this, a combination of the state of Machine "stopped" and the states of 3 Ms other than Machine is checked. When the state of Man "shortage" is present in the same period between time points as that of the state of Machine "stopped", the factor in the loss is determined to be "worker shortage" (specifically, the loss factor "worker shortage" is associated with a combination of the state of Machine "stopped", the state of Material "-" (e.g., an unspecified state), the state of Man "shortage", and the state of Method "-"). When the state of Material "shortage" is present in the same period between time points as that of the state of Machine "stopped", the factor in the loss is determined to be "waiting for workpiece". Thus, it is possible to accurately determine the loss factor from the state combination.

The productivity calculation section 168 calculates a productivity (e.g., a run ratio) in the time block including occurrence periods of two or more losses, and a second productivity which is a productivity in the same time block when it is assumed that a selected loss factor is eliminated. The display section 166 displays the calculated productivities. A manager can see productivities before and after the elimination of the loss factor for each loss factor. Therefore, the manager can find out which loss factor should be eliminated in order to improve the productivity most effectively.

Hereinbelow, the present embodiment will be described in detail.

Figure 2:
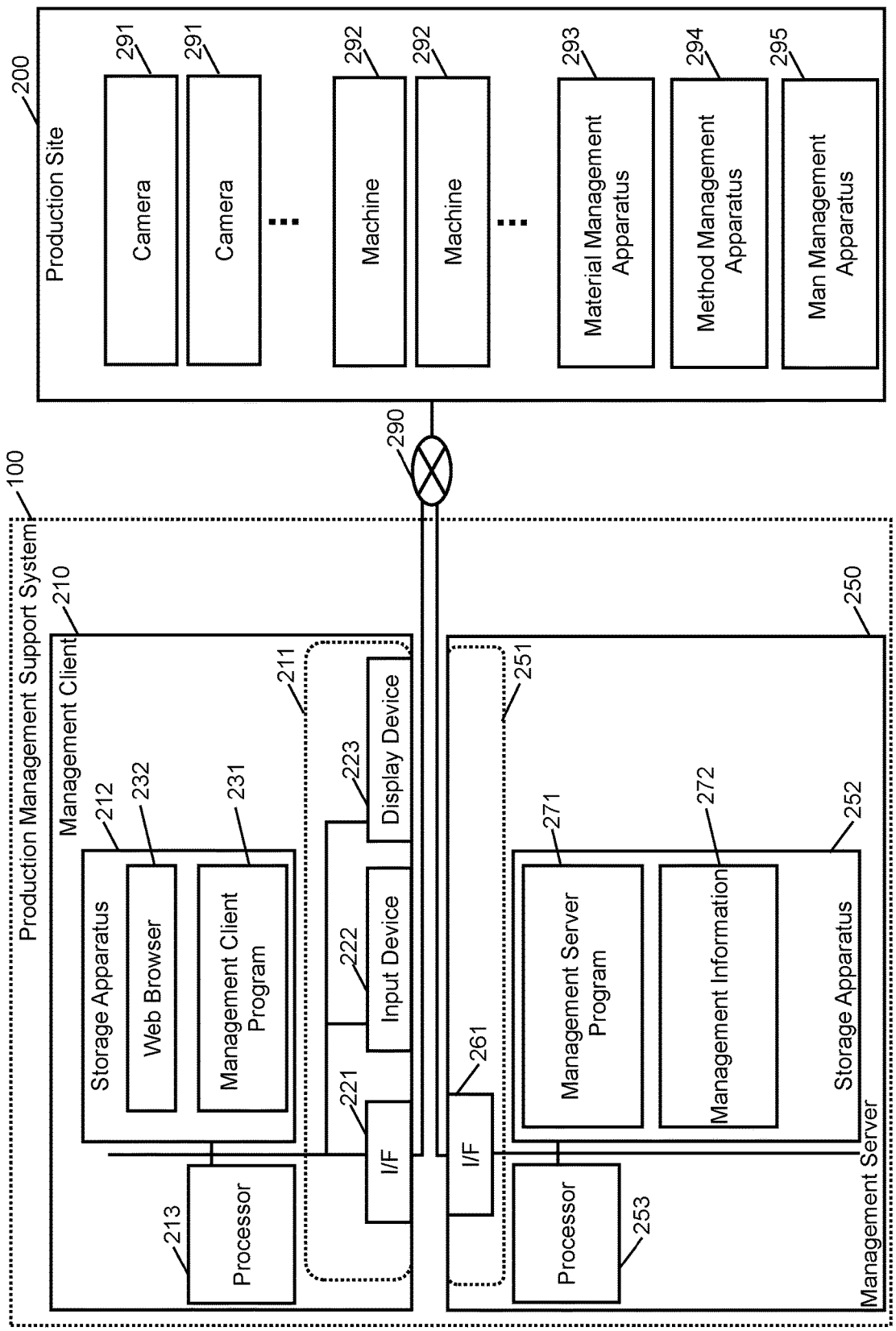
FIG. 2 shows an example of the configuration of an entire system including a production management support system according to the embodiment.

FIG. 2 shows an example of the configuration of an entire system including the production management support system 100.

The production management support system 100 includes a management server 250, and one or more management clients 210 coupled to the management server 250. To the management server 250, the management client 210 and a production site 200 are coupled via a communication network (e.g., a local area network (LAN), a wide area network (WAN), or the Internet) 290.

A plurality of cameras 291 are installed at the production site 200. Each camera 291 records a video. Recorded video data representing the recorded video is transmitted to the production management support system 100.

In addition, at the production site 200, a production system (e.g., a line production system, a job shop production system, or a cell production system) is provided. In the production system, for example, one or a plurality of machines 292 are provided. The machine 292 is an example of an element belonging to Machine, and is, e.g., production equipment.

In addition, at the production site 200, a Material management apparatus 293 for managing elements belonging to Material (e.g., a workpiece), a Method management apparatus 294 for managing elements belonging to Method (e.g., a tool), and a Man management apparatus 295 for managing elements belonging to Man (e.g., a worker) are provided. In the present embodiment, for simplifying the description, the element belonging to Material is the workpiece, the element belonging to Method is the tool, and the element belonging to Man is the worker.

Data measured by a plurality of apparatuses installed at the production site 200 (data including, e.g., measurement time points and measured values) is transmitted to the management server 250 through a gateway from the plurality of apparatuses, and is stored in a storage apparatus 252 of the management server 250. "The plurality of apparatuses" mentioned herein may include, e.g., the machine 292, the Material management apparatus 293, the Method management apparatus 294, and the Man management apparatus 295. For example, the following operations may be performed.

Data measured by a sensor provided in the machine 292 may be transmitted to the management server 250. The time series of the data or data based on the time series of the data may be used as time series data of the state of the machine 292.

The Material management apparatus 293 may measure a measurement target with the camera 291 or other sensors. Data measured by the Material management apparatus 293 may be transmitted to the management server 250. The time series of the data or data based on the time series of the data may be used as time series data of the state of the workpiece.

The Method management apparatus 294 may measure a measurement target with the camera 291 or other sensors. Data measured by the Method management apparatus 294 may be transmitted to the management server 250. The time series of the data or data based on the time series of the data may be used as time series data of the state of the tool.

The Man management apparatus 295 may measure the presence or absence of the worker with the camera 291 or other sensors, or may also manage entrance and departure time points of the worker as an entrance and departure management apparatus. Data measured by the Man management apparatus 295 may be transmitted to the management server 250. The time series of the data or data based on the time series of the data may be used as time series data of the state of the worker.

The management client 210 has an interface apparatus 211, a storage apparatus 212, and a processor 213 coupled to the interface apparatus 211 and the storage apparatus 212.

The interface apparatus 211 includes an I/F (a communication interface device coupled to the communication network 290) 221, an input device (e.g., a pointing device and a keyboard) 222, and a display device (a device having a physical screen on which information is displayed) 223. A touch screen in which the input device 222 and the display device 223 are integrated with each other may also be used.

The storage apparatus 212 stores a computer program executed in the processor 213 and information used by the processor 213. Specifically, the storage apparatus 212 stores, e.g., a management client program 231 and a Web browser 232. The management client program 231 communicates with the management server 250, and displays a UI such as the above-described loss factor management UI 165 via the Web browser 232.

The management server 250 has an interface apparatus 251, a storage apparatus 252, and a processor 253 coupled to the interface apparatus 251 and the storage apparatus 252.

The interface apparatus 251 includes an I/F (a communication interface device coupled to the communication network 290) 261.

The storage apparatus 252 stores a computer program executed in the processor 253 and information used by the processor 253. Specifically, the storage apparatus 252 stores, e.g., a management server program 271 and management information 272. The management server program 271 communicates with the management client program 231. The management information 272 may include data from the production site 200.

By coordination processing of the management server program 271, the management client program 231, and the Web browser 232, the display of the UI such as the loss factor management UI 165 is implemented.

A relationship between components shown in FIG. 2 and the components shown in FIG. 1 is as follows. That is, of the interface apparatuses 211 and 251, at least the interface apparatus 251 corresponds to the interface apparatus 110. Of the storage apparatuses 212 and 252, at least the storage apparatus 252 corresponds to the storage apparatus 120. Of the processors 213 and 253, at least the processor 253 corresponds to the processor 130. Of the management server program 271, the management client program 231, and the Web browser 232, at least the management server program 271 corresponds to the support program 150.

The management information 272 includes, e.g., tables shown as examples in FIGS. 3 to 9. Hereinbelow, the tables shown in FIGS. 3 to 9 will be described.

FIG. 3 shows an example of the configuration of a loss factor rule table.

A loss factor rule table 300 shows a correspondence between the state combination (the combination of the states of 4 Ms) and the loss factor. One record indicates a correspondence between one state combination and one loss factor. Note that the state "-" denotes an unspecified state.

Hereinbelow, the state combination in the present embodiment is expressed as [A, B, C, D]. A denotes the state of Man, B denotes the state of Machine, C denotes the state of Material, and D denotes the state of Method. Accordingly, the state combination indicated by the first record of the table 300 shown as an example in FIG. 3 is [shortage, stopped, -]. For Machine, the state "-" denotes an unspecified state which may be any state other than "stopped". For each of 3 Ms other than Machine, the state "-" denotes the unspecified state which may be any state other than "shortage".

According to the example shown in FIG. 3, in the case where the state of Machine is "stopped", a plurality of loss factors are conceivable, and determination of a corresponding loss factor depends on the state of each of 3 Ms other than Machine. For example, when the state combination is [shortage, stopped, -, -] (the state of Machine is "stopped", the state of Man is "shortage", and each of the states of remaining 2 Ms is "-"), the loss factor is determined to be "worker shortage". When the state combination is [-, stopped, shortage, -], the loss factor is determined to be "waiting for workpiece". When the state combination is [-, stopped, -, shortage], the loss factor is determined to be "waiting for tool".

Note that, when the state combination is, e.g., [-, stopped, shortage, shortage], the loss factor is "impossible to be determined". There is a state combination which has high possibility of occurrence of the loss but has difficulty in determining the loss factor such as the above-described example in which two or more Ms each having the state "shortage" are present. The state combination is highly likely to correspond to the occurrence of the loss, and hence the state combination is registered in the loss factor rule table 300, but the loss factor corresponding to the state combination is "impossible to be determined". The loss factor "impossible to be determined" denotes that it is impossible to determine the loss factor (e.g., it is impossible to narrow down the loss factors to one loss factor).

In addition, for each of 4 Ms, the state of the M is dependent on the state of one or more elements belonging to the M. For example, the state of Machine "stopped" may be the state in the case where the state of one or more machines 292 is "stopped".

In the present embodiment, the loss factor rule table 300 which has the state combination as input and has the loss factor as output is provided in advance, but a machine learning model (e.g., a neural network) which has the state combination as input and has the loss factor as output may also be used instead of the table 300.

FIG. 4 shows an example of the configuration of a 4-M time series table.

A 4-M time series table 400 is an example of the time series data group of 4 Ms, and shows the time series of the state of each of 4 Ms. For example, data representing the state of each of 4 Ms is periodically (e.g., every minute) collected. Each record of the 4-M time series table 400 indicates a time point (a start time point of a period between time points), the type of M from among 4 Ms, the name of the element belonging to the M, and the state of the element. According to the example shown in FIG. 4, with regard to Man, the state of worker 5 is "shortage" in a period between April 1, 09:00 and April 1, 09:01.

From the 4-M time series table 400, the state combination of each period between time points (e.g., minute-by-minute state combination) is identified.

Note that, with regard to each of 4 Ms, the state of the element belonging to the M may be a state described in data collected from the production site 200, or may also be a state identified from measured values described in the collected data.

In addition, in the present embodiment, the unit of the time point is month/day/hour/minute, but the unit of the time point may also be broader or narrower.

FIG. 5 shows an example of the configuration of the loss factor registration table.

A loss factor registration table 500 shows the result of the loss factor determination of each period between time points. For example, each record of the loss factor registration table 500 indicates a time point (a start time point of a period between time points), a determined loss factor, and the detail of the loss factor. A method for identifying the detail of the loss factor will be described later.

Note that, in the present embodiment, the minute-by-minute state combination is identified, and hence the minute-by-minute loss factor determination result is registered.

In the case where the state combination does not correspond to the loss state combination (the state combination defined as the loss), the loss factor (and the loss factor detail) may be "-" (denotes that the occurrence of the loss is not present).

FIG. 6 shows an example of the configuration of a video management table.

A video management table 600 is a table for management of recorded video data. For example, in the present embodiment, the recorded video data is stored in a file format. Each record of the video management table 600 indicates the file name of a recorded video file, the camera name of a camera having recorded a video indicated by the recorded video file, and the start time point and the end time point of recording.

FIG. 7 shows an example of the configuration of an area management table.

An area management table 700 is a table for managing a plurality of areas at the production site 200. Each record of the area management table 700 indicates an area name, the element name of an element belonging to the area, and the classification of the element.

According to the examples shown in FIGS. 6 and 7, in an area "Area-A" which is one of the areas at the production site 200, a camera "Camera-A" is installed, and a worker "worker 5" is present.

Figure 8:
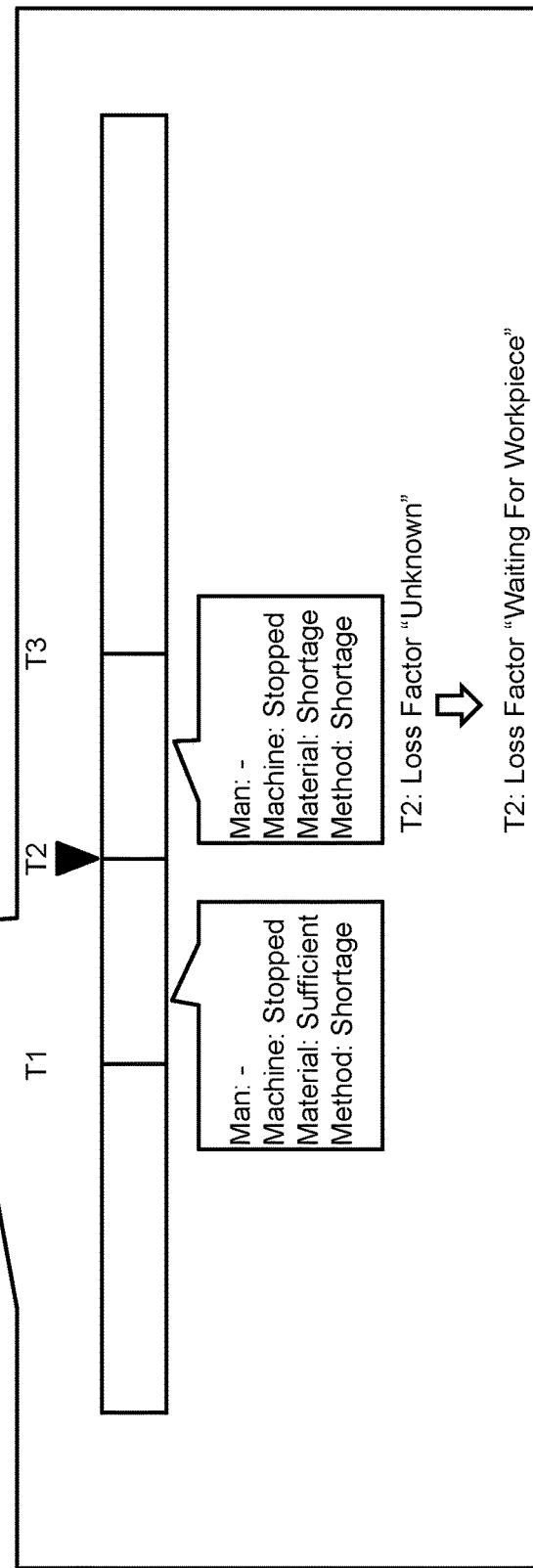
FIG. 8 shows an example of the configuration of a previous combination table.

FIG. 8 shows an example of the configuration of a previous combination table.

A previous combination table 800 shows, for each state combination which has the loss factor "impossible to be determined" in the loss factor rule table 300, a state combination in a period between time points immediately before a period between time points corresponding to the state combination which allows the determination of the loss factor.

The example shown in FIG. 8 is, e.g., as follows. That is, a state combination (a state combination corresponding to the loss factor "impossible to be determined") at a time point T2 (a period between time points T2 and T3) is [-, stopped, shortage, shortage]. A state combination at an immediately preceding time point T1 (an immediately preceding period between time points T1 and T2) is [-, stopped, sufficient, shortage]. When these states are compared with each other, it can be seen that, with regard to Material and Method each having the state "shortage" at the time point T2, the state of Method is still "shortage" but the state of Material is changed from "sufficient" to "shortage" from the time point T1 to the time point T2. Consequently, the factor in the loss which is determined to have occurred at the time point T2 is determined to be "waiting for workpiece".

Thus, even when the state combination in a target period between time points is the loss state combination, in the case where the loss factor is "impossible to be determined", it is possible to determine the loss factor in the target period between time points from a difference between the state combination in the target period between time points and the state combination in the period between time points immediately before the target period between time points.

FIG. 9 shows an example of the configuration of a subsequent combination table.

A subsequent combination table 900 shows, for each state combination which has the loss factor "impossible to be determined" in the loss factor rule table 300, a state combination in a period between time points immediately after a period between time points corresponding to the state combination which allows the determination of the loss factor.

The example shown in FIG. 9 is, e.g., as follows. That is, a state combination (a state combination corresponding to the loss factor "impossible to be determined") at a time point T11 (a period between time points T11 and T12) is [-, stopped, shortage, shortage]. A state combination at an immediately subsequent time point T12 (an immediately subsequent period between time points T12 and T13) is [-, stopped, sufficient, shortage]. When these state combinations are compared with each other, it can be seen that, with regard to Material and Method each having the state "shortage" at the time point T11, the state of Method is still "shortage" but the state of Material is changed from "sufficient" to "shortage" from the time point T11 to the time point T12. Consequently, when the state combination at the time point T12 is found out, it becomes possible to determine that the factor in the loss which is determined to have occurred at the time point T11 is "waiting for workpiece".

Thus, even when the state combination in the target period between time points is the loss state combination, in the case where the loss factor is "impossible to be determined", it is possible to determine the loss factor in the target period between time points from a difference between the state combination in the target period between time points and the state combination in the period between time points immediately after the target period between time points.

The foregoing is the description of the examples of the tables included in the management information 272. Note that, in the present embodiment, both of the previous combination table 800 and the subsequent combination table 900 are used, but one of them may not be used.

Next, examples of the UI displayed by the display section 166 will be described. The UI to be displayed includes the loss factor management UI 165 and the productivity management UI.

Figure 10:
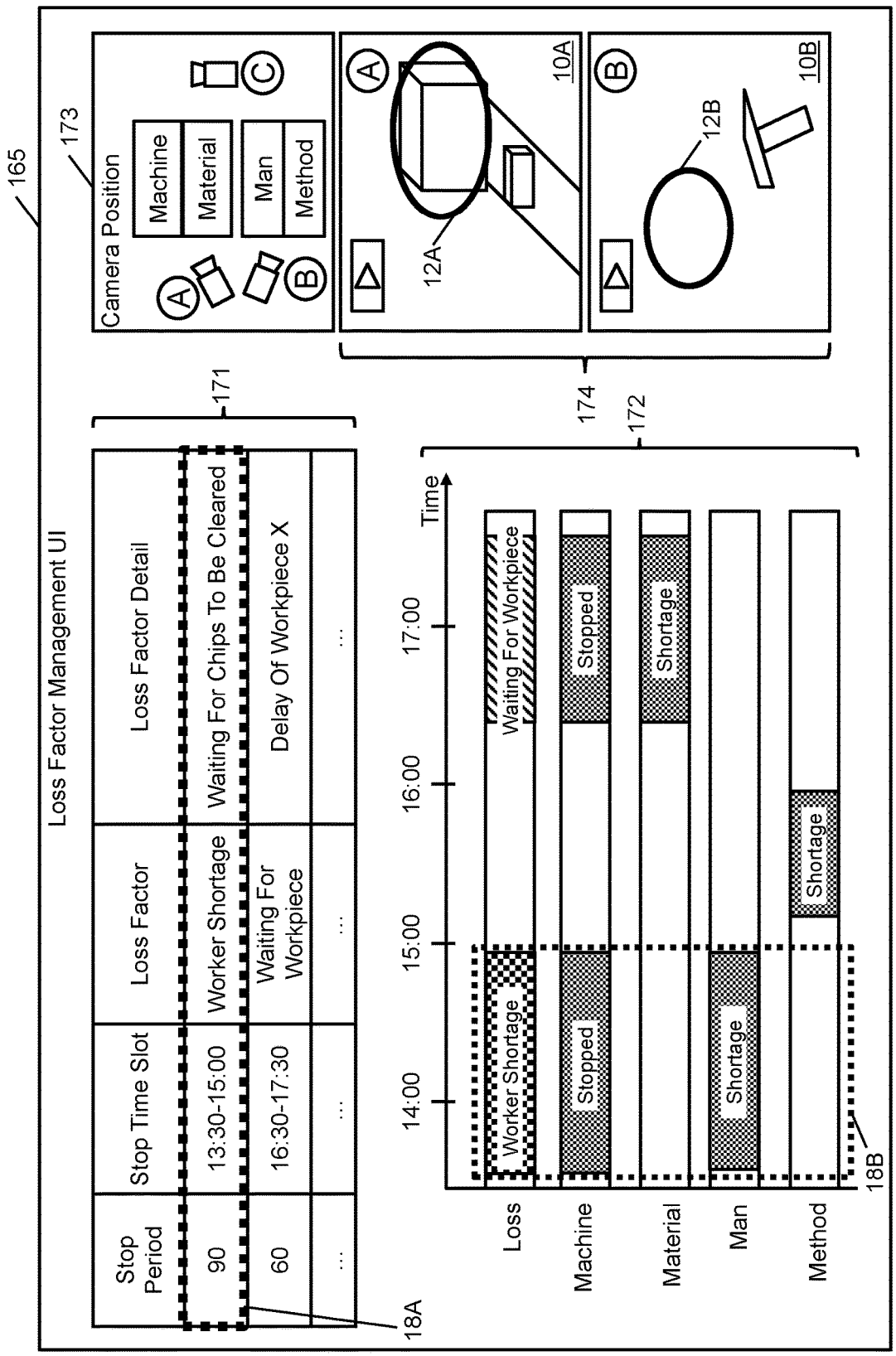
FIG. 10 shows an example of a loss factor management UI.

FIG. 10 shows an example of the loss factor management UI.

In the loss factor management UI 165, a loss factor list 171, a loss factor chart 172, video guide information 173, and a video group 174 are displayed.

The loss factor list 171 is a list of determined loss factors. The loss factor list 171 indicates, for each determined loss factor, an occurrence period of the loss corresponding to the loss factor (the total of periods between time points in which the loss factor has continued), an occurrence time block of the loss (from the beginning of the first period between time points of the loss factor to the end of the last period between time points), the loss factor, and the detail of the loss factor. The list 171 is based on the loss factor registration table 500. According to the example shown in FIG. 10, in the list 171, the loss factors are listed in the descending order of the occurrence period.

The loss factor chart 172 shows the time series of the loss factor and the time series of the state combination (i.e., the time series of the state of each M) according to the same time axis (e.g., the horizontal axis). The loss factor chart 172 may be a bar graph, a Gantt chart, or a chart similar thereto. To the loss factor chart 172, for example, a display-target time block is input from a manager, and the time block may be indicated by the time axis. The time series of the loss factor and the time series of the state of each M are arranged along an axis orthogonal to the time axis. The time series of the loss factor is based on the loss factor registration table 500. The time series of the state of each M is based on the 4-M time series table 400. In the loss factor chart 172, as an expression of each of the loss factor and the state, any expression may be used. For example, as the expression, the text of the name of the loss factor or the state may be used or, instead of or in addition to the text of the name thereof, a color corresponding to the loss factor or the state, a pattern corresponding to the loss factor or the state, or a combination of the color and the pattern may be used. From the loss factor chart 172, the manager realizes the occurrence time block of the loss, the factor in the loss, and the state combination corresponding to the factor.

A sub-UI (or another UI such as a pull-down menu) of one of the loss factor list 171 and the loss factor chart 172 may receive selection of the loss factor from the manager. At least one of objects 18A and 18B which facilitate visual recognition of the selected loss factor may be displayed by the display section 166. Hereinafter, an area in which the element related to the selected loss factor is present is referred to as "a target area". "The element related to the selected loss factor" is an element belonging to the M corresponding to a specific state in the state combination corresponding to the selected loss factor. For example, in the case where the selected loss factor is "worker shortage" and, therefore, the state combination is [shortage, stopped, -, -], the specific state denotes "shortage" and "stopped", and "the M corresponding to a specific state" denotes Man and Machine.

The video guide information 173 is information related to the target area, and indicates a correspondence between the camera 291 present in the target area and a video 10 in the video group 174. In addition, the video guide information 173 indicates a relationship between the camera 291 present in the target area and an image-capturing target of the camera 291.

The video group 174 includes one or more recorded videos 10 of the target area. According to an example of the video guide information 173 shown in FIG. 10, three cameras A to C are present in the target area, and hence the video group 174 may include three videos corresponding to the cameras A to C. However, in the present embodiment, the video group 174 includes videos 10A and 10B corresponding to, among the cameras A to C, the cameras A and B, and does not include a video corresponding to the camera C. This is because cameras image-capturing the element belonging to the M of the type related to the loss factor selected by the manager are, among the cameras A to C, only the cameras A and B. A specific example is as follows. That is, in this example, the loss factor selected by the manager is "worker shortage". The state combination corresponding to the loss factor "worker shortage" is [shortage, stopped, -, -]. Accordingly, "the M of the type related to the loss factor" is each of Man corresponding to "shortage" and Machine corresponding to "stopped". The camera image-capturing the element (worker) belonging to Man is the camera A, and the camera image-capturing the element (machine) belonging to Machine is the camera B. Consequently, the videos 10A and 10B corresponding to, among the cameras A to C, the cameras A and B are displayed. Note that, thus, instead of narrowing down display-target videos, the video group 174 may include a plurality of videos and, among the plurality of videos, a video corresponding to the camera which has a target element which is the element belonging to the M of the type related to the selected loss factor as the image-capturing target may be highlighted. For example, the video corresponding to the camera which has the target element as the image-capturing target may be disposed at the uppermost position, or a video area may be enlarged. Association of the camera with the element serving as the image-capturing target may be performed in a table such as the area management table 700.

In the video 10 corresponding to the camera which has the target element as the image-capturing target, an element other than the target element can be shown in addition to the target element. To cope with this, in the present embodiment, only the target element in the video 10 may be highlighted. For example, in the video 10A, of a machine and a workpiece, the machine is the target element, and hence an object 12A (e.g., a mark) which emphasizes the machine may be displayed. Similarly, in the video 10B, of a tool and a worker who is not shown (a workers in the state of "shortage"), the worker is the target element, and hence an object 12B (e.g., a mark) indicative of an area of the worker may be displayed.

Figure 11:
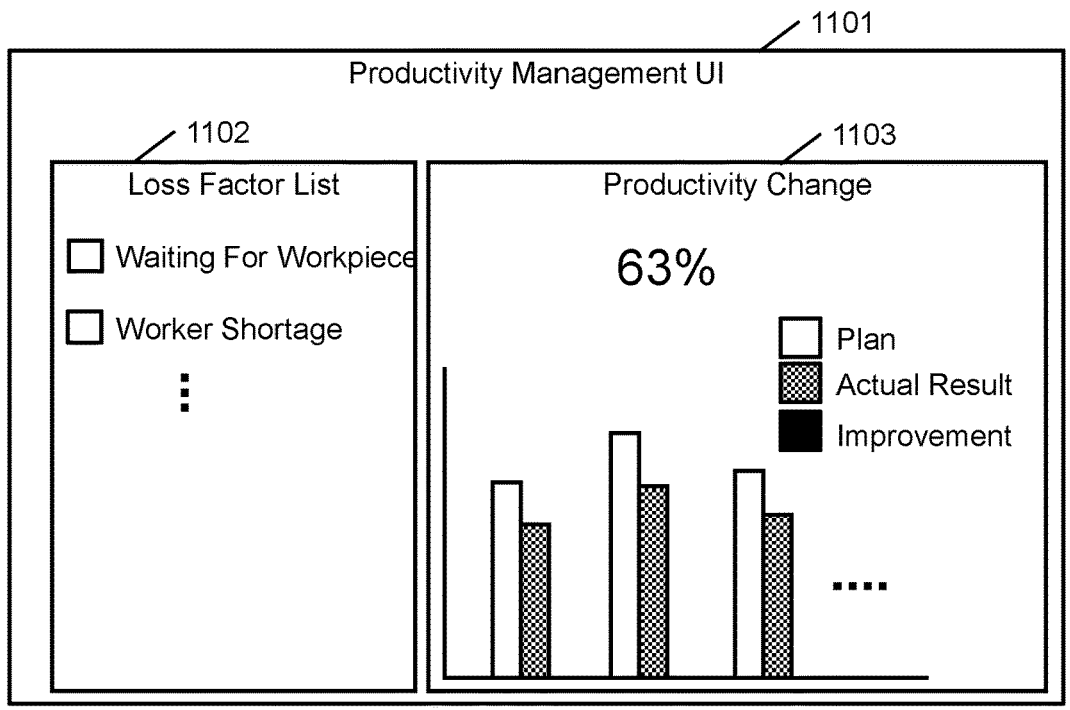
FIG. 11 shows an example of a productivity management UI before a loss factor is selected.
Figure 12:
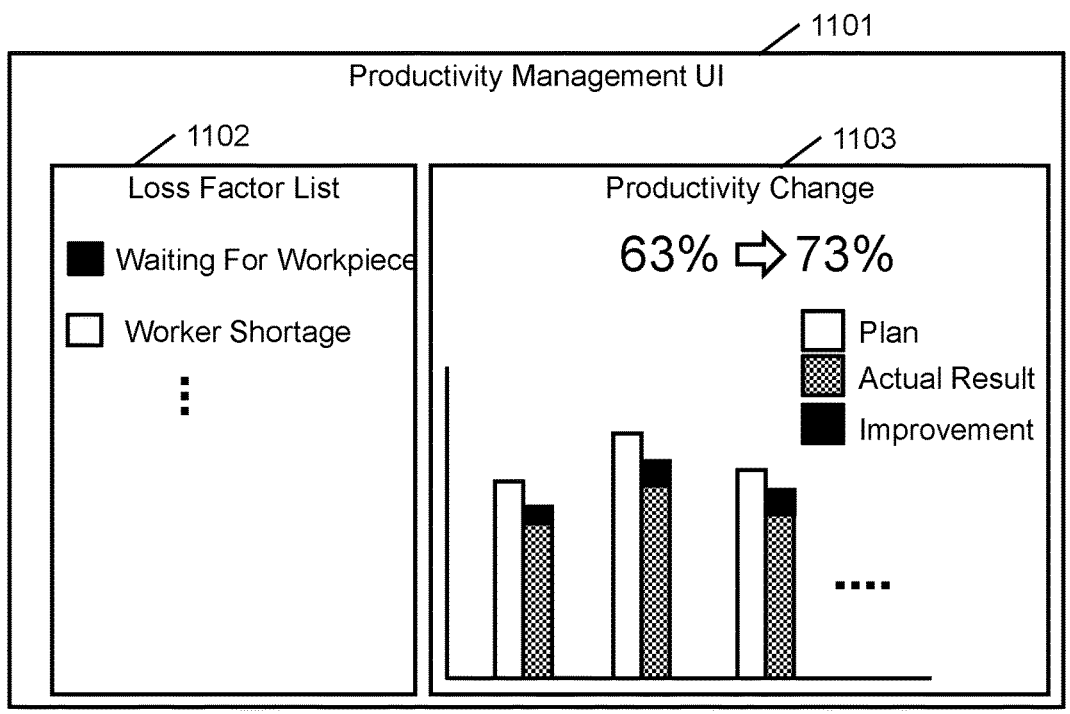
FIG. 12 shows an example of the productivity management UI after the loss factor is selected.

Each of FIGS. 11 and 12 shows an example of the productivity management UI. Specifically, FIG. 11 shows an example of the productivity management UI before the loss factor is selected. FIG. 12 shows an example of the productivity management UI after the loss factor is selected.

A productivity management UI 1101 shows a loss factor list 1102 and a productivity change 1103.

The loss factor list 1102 is a list of determined loss factors. The loss factor list 1102 is based on the loss factor registration table 500.

The productivity change 1103 shows the change of the productivity. The productivity change 1103 is, e.g., a chart having a time axis (e.g., the horizontal axis) and a productivity axis (e.g., the vertical axis). The productivity of each period (e.g., of each day) in a period (e.g., a given week) specified by the manager is displayed in the chart. As the productivity, a productivity which is a planned productivity and a productivity which is an actual-result productivity are displayed. In addition, in the productivity change 1103, a numerical value indicative of the productivity representing the actual result in a predetermined period is displayed.

It is assumed that the manager selects the loss factor "waiting for workpiece" from the loss factor list 1102 of the productivity management UI 1101 shown as an example in FIG. 11. In this case, as shown as an example in FIG. 12, a productivity in the case where it is assumed that the occurrence period of the loss factor "waiting for workpiece" is excluded is displayed in the form of each of the numerical value and the chart.

In the present embodiment, "the productivity" may be "a run ratio". The run ratio=100×(operation period+loss occurrence period)/run period may be satisfied. That is, when it is assumed that the selected loss factor is eliminated, the occurrence period of the loss is added to the operation period and, as a result, the run ratio is increased. For example, it is assumed that the operation period is "15", the run period (may also be referred to as an actual operation period) is "24", and the loss occurrence period of the loss factor "waiting for workpiece" is "2.4". In the case where the selection of the loss factor "waiting for workpiece" is not made (i.e., in the case where the loss of the loss factor "waiting for workpiece" is present), the run ratio=100×(15/24)=62.5%≈63% is satisfied. In the case where the selection of the loss factor "waiting for workpiece" is made (i.e., in the case where it is assumed that the loss of the loss factor "waiting for workpiece" is not present), the run ratio=100×(15+2.4/24)=72.5%≈73% is satisfied.

Thus, when the loss factor is individually selected, the manager can find out which loss factor should be eliminated in order to maximize the improvement of the productivity.

Hereinbelow, examples of processing performed in the present embodiment will be described. Examples of the processing performed in the present embodiment include loss factor determination processing, loss factor display processing, and productivity display processing.

Figure 13:
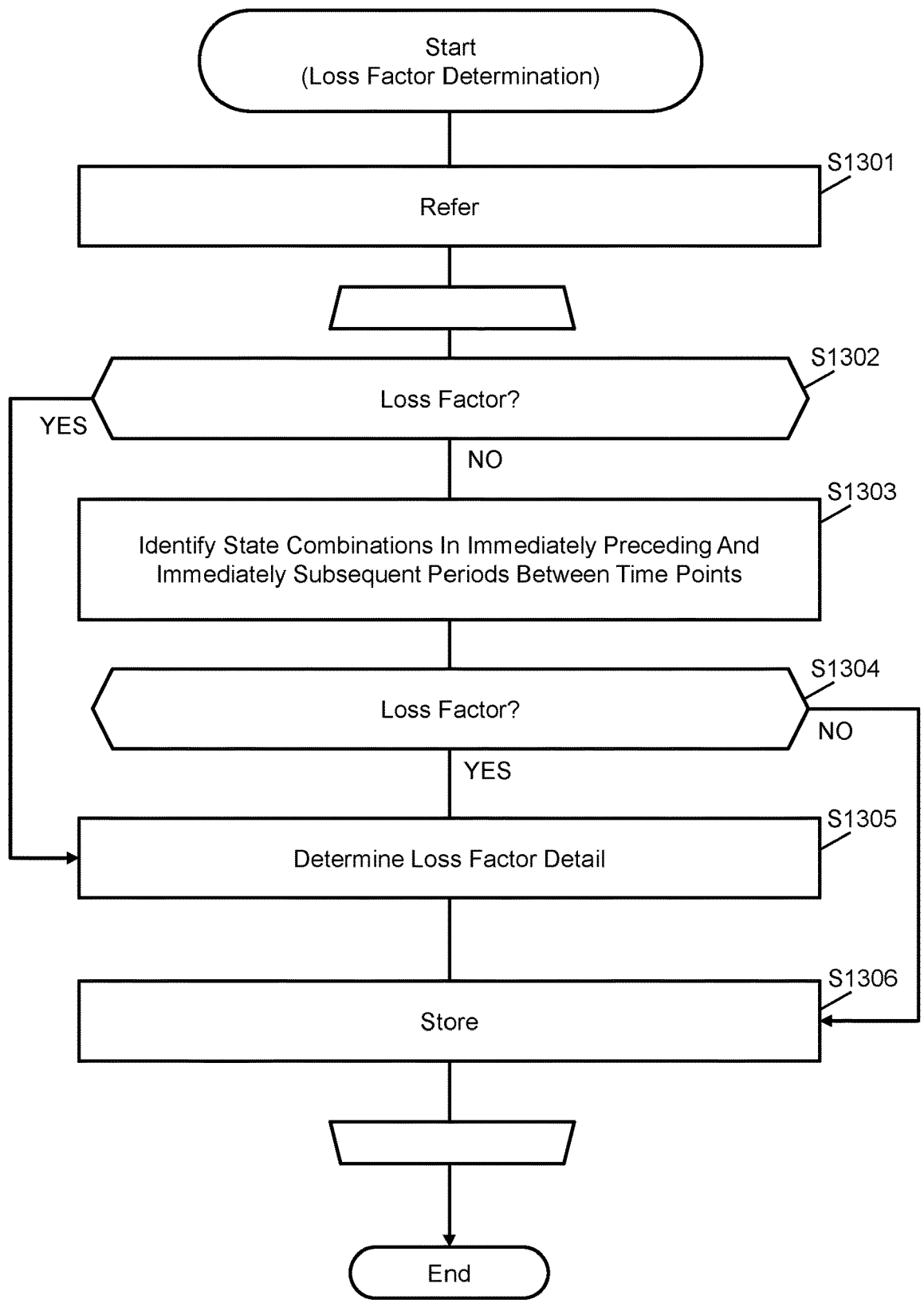
FIG. 13 shows an example of the procedure of loss factor determination processing.

FIG. 13 shows an example of the procedure of the loss factor determination processing.

The loss factor determination section 164 refers to the 4-M time series table 400 (S1301). S1302 to S1306 are performed for each period between time points. One of periods between time points will be taken as an example ("a target period between time points" in the description of FIG. 13).

That is, the loss factor determination section 164 identifies the state combination in the target period between time points from the 4-M time series table 400, and determines whether or not the loss factor corresponding to the state combination is determined (S1302). In S1302, "the loss factor is determined" denotes that any loss state combination corresponding to the identified state combination is found in the loss factor rule table 300, and the loss factor corresponding to the loss state combination is not "impossible to be determined".

In the case where the result of the determination in S1302 is true (S1302: YES), the loss factor determination section 164 determines the detail of the determined loss factor (S1305). Specifically, for example, the loss factor determination section 164 may determine the loss factor detail from the record in the 4-M time series table 400 which corresponds to the M of the type related to the determined loss factor and the target period between time points. In order to increase accuracy in the determination of the loss factor detail, each record in the 4-M time series table 400 may include information indicating the detail of the state for the element indicated by the element name included in the record.

In the case where the result of the determination in S1302 is false (S1302: NO), the loss factor determination section 164 identifies the state combinations in periods between time points immediately before and after the target period between time points from the 4-M time series table 400 (S1303). Subsequently, the loss factor determination section 164 refers to at least one of the previous combination table 800 and the subsequent combination table 900, and determines whether or not the loss factor corresponding to the state combination in the target period between time points is determined (S1304). In S1304, "the loss factor is determined" denotes one of the following.

A combination which matches a combination (pair) of the state combination in the target period between time points identified in S1302 and the state combination in the immediately preceding period between time points identified in S1303 is registered in the previous combination table 800, and hence the loss factor corresponding to the matching combination is identified.

A combination which matches a combination of the state combination in the target period between time points identified in S1302 and the state combination in the immediately subsequent period between time points identified in S1303 is registered in the subsequent combination table 900, and hence the loss factor corresponding to the matching combination is identified.

In the case where the result of the determination in S1304 is true (S1304: YES), the loss factor determination section 164 determines the detail of the determined loss factor (S1305).

After S1305, and in the case where the result of the determination in S1304 is false (S1304: NO), the loss factor determination section 164 registers the result of the loss factor determination in the loss factor registration table 500 (S1306). For example, specific operations are as follows.

In the case where S1305 is performed, in the loss factor registration table 500, the start time point of the target period between time points is registered as the time point, the loss factor determined in S1302 or S1304 is registered as the loss factor, and the loss factor detail determined in S1305 is registered as the loss factor detail.

In the case of S1304: NO, in the loss factor registration table 500, the start time point of the target period between time points is registered as the time point, and "-" is registered as each of the loss factor and the loss factor detail.

Figure 14:
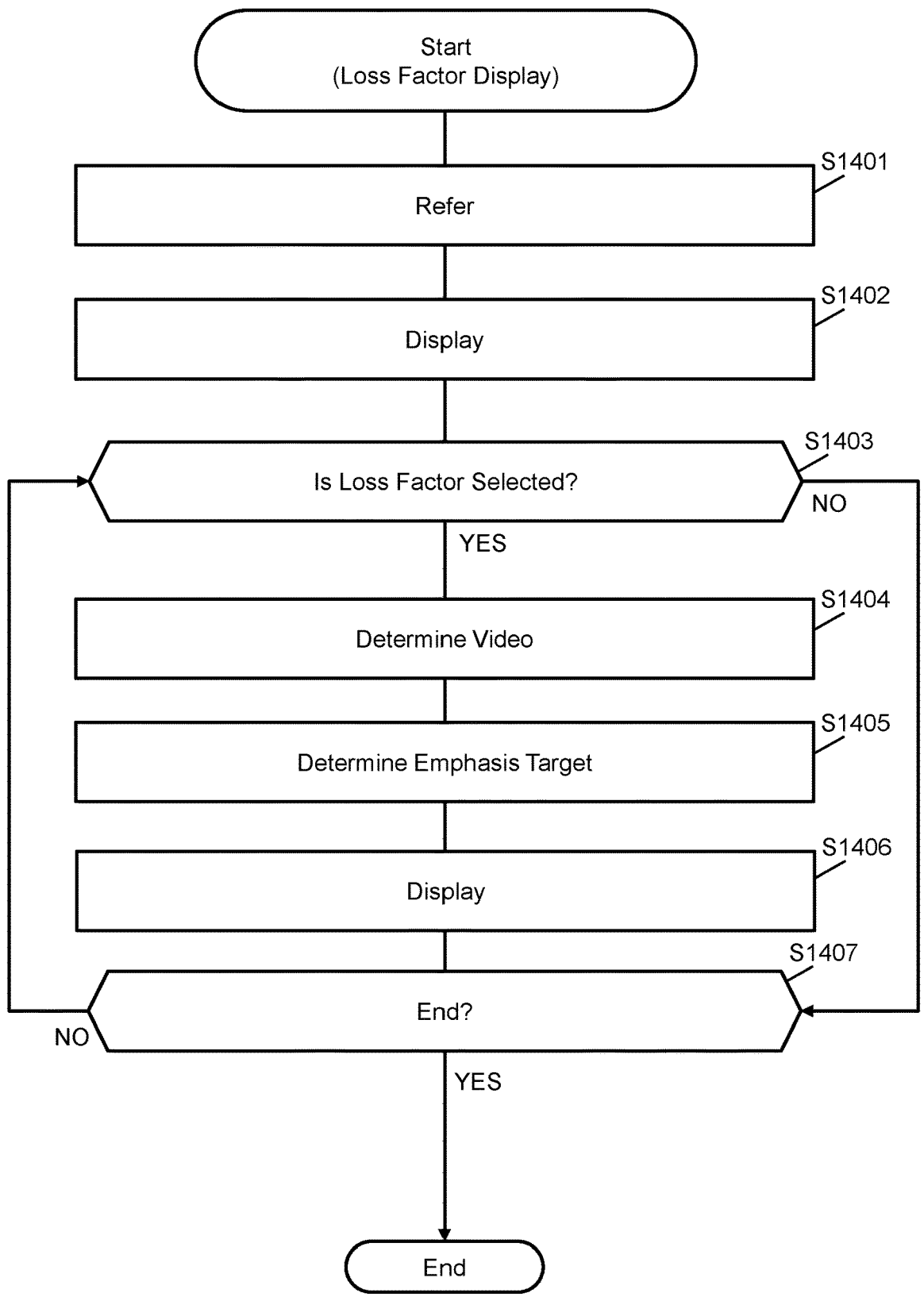
FIG. 14 shows an example of the procedure of loss factor display processing.

FIG. 14 shows an example of the procedure of the loss factor display processing.

The display section 166 refers to the 4-M time series table 400 and the loss factor registration table 500 (S1401), and displays the loss factor management UI 165 based on the tables 400 and 500 (S1402). In the loss factor management UI 165, the loss factor list 171 is based on the loss factor registration table 500. In the loss factor chart 172, the time series of the loss is based on the loss factor registration table 500, and the time series of the state of each of 4 Ms is based on the 4-M time series table 400. To the loss factor management UI 165 displayed in S1402, for example, at least one of the following may be applied.

A display-target period may be a predetermined default period (e.g., a predetermined period previous to a point of time of display).

The video guide information 173 may be information related to a predetermined default area.

The video group 174 may include a recorded video of a camera installed in the area.

In the case where the selection of any loss factor is received from the manager through the loss factor management UI 165 (S1403: YES), the display section 166 determines one or more videos serving as the video group 174 (S1404). In S1404, for example, the following are performed. In the description of FIG. 14, the selected loss factor is referred to as "a selected loss factor".

The display section 166 identifies, by using the element name of an element belonging to an M of a type related to the selected loss factor as a key, an area in which the element is present from the area management table 700, and identifies, by using the area name of the area as a key, one or more cameras which image-capture the area. "an M of a type related to the selected loss factor" is an M in a specific state which has the state "stopped" or "shortage" in the state combination corresponding to the selected loss factor.

The display section 166 identifies, for each of the identified one or more cameras, the file of a video which is recorded by the camera and includes at least part of the occurrence time block of the loss corresponding to the selected loss factor in the recording time block (from start time point to end time point) from the video management table 600. Herein, one or more video files are identified for each camera.

The display section 166 determines, for each camera, the video which includes the occurrence time block of the loss in the recording time block from one or more video files.

The display section 166 determines an emphasis target from among one or more videos determined in S1404 (S1405). In S1405, for example, at least one of the following is performed.

The display section 166 identifies, among the determined one or more videos, a target video which is a video having the element belonging to the M of the type related to the selected loss factor as the image-capturing target from, e.g., the area management table 700. In the area management table 700, for example, information indicative of the element serving as the image-capturing target (e.g., the element name) may be associated with each camera.

In one or more videos determined in S1404, the display section 166 identifies the element belonging to the M of the type related to the selected loss factor through, e.g., analysis of the video or from the 4-M time series table 400, and determines the identified element to be the element serving as a highlighting target.

The display section 166 updates the display of the loss factor management UI 165 based on the results of S1404 and S1405 (S1406). In S1405, for example, at least one of the following is performed.

In the case where the target video is determined in S1405, the display section 166 displays the target video as the video group 174, or highlights the target video in the video group 174.

In the case where the element serving as the highlighting target is determined in S1405, the display section 166 highlights the element determined to be the highlighting target in one or more videos. "The highlighting of the element" may be highlighting of an element shown in the video or may also be highlighting of an element which is supposed to be shown in the video but is not actually shown in the video. The element which is supposed to be shown in the video may be, e.g., an element corresponding to the element name having the state "shortage" which is identified from the 4-M time series table 400, or may also be an element identified from a plan table which is not shown (e.g., a table showing a plan indicative of which element is present, when the element is present, and where the element is present). An example of the highlighting of the element is the display of the objects 12A and 12B shown as an example in FIG. 10.

In the case where the end of the display is specified from the manager (S1407: YES), the processing is ended.

Figure 15:
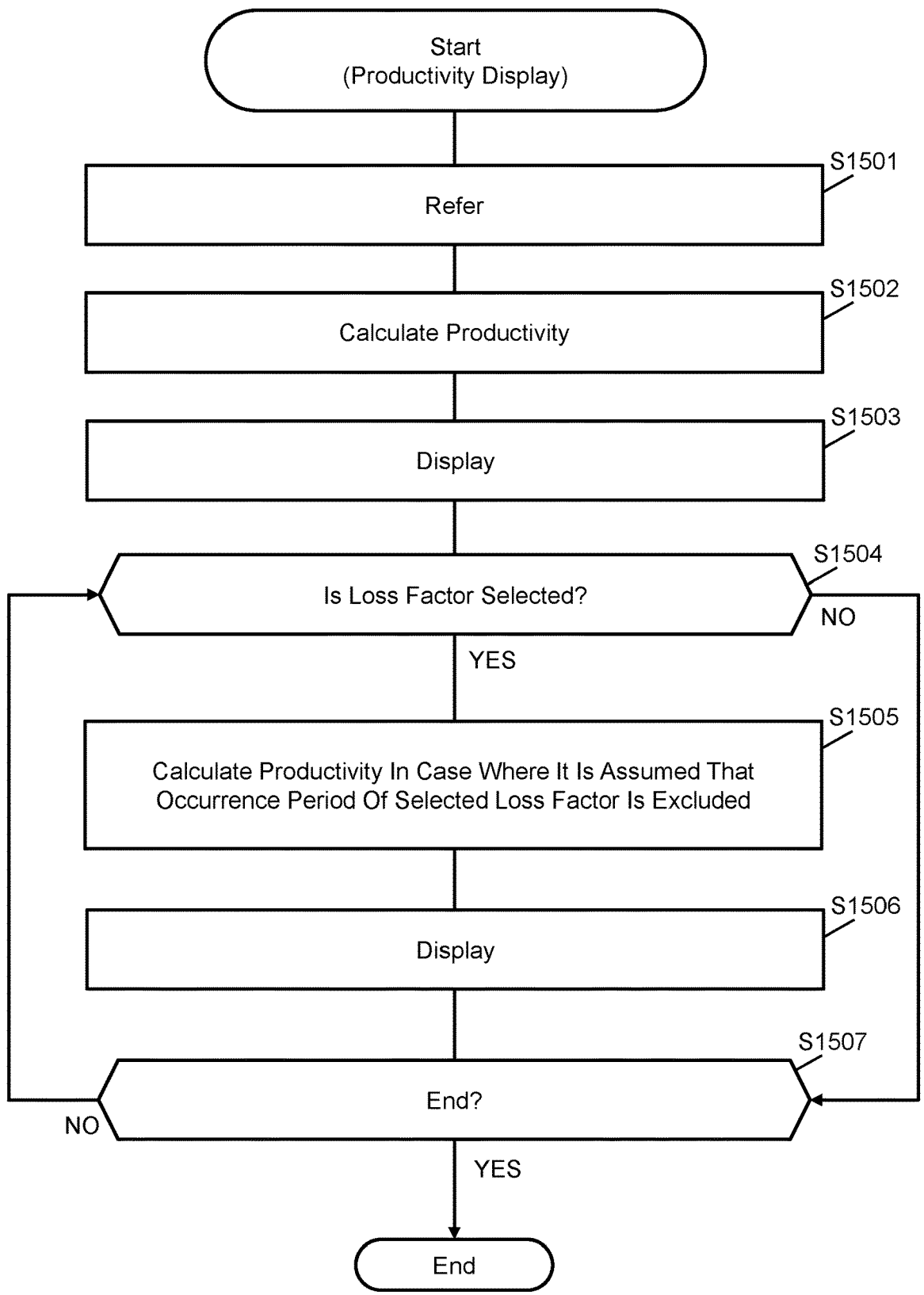
FIG. 15 shows an example of the procedure of productivity display processing.

FIG. 15 shows an example of the procedure of the productivity display processing.

The productivity calculation section 168 refers to the 4-M time series table 400 (S1501), and calculates a productivity in a specified period based on the table 400 (S1502). The display section 166 displays the productivity management UI 1101 (S1503). In the productivity management UI 1101, the loss factor list 1102 is based on the loss factor registration table 500. The productivity change 1103 shows the productivity calculated in S1502.

In the case where the selection of any loss factor is received from the manager through the productivity management UI 1101 (S1504: YES), the productivity calculation section 168 calculates a productivity in the case where it is assumed that the occurrence period of the selected loss factor is excluded (S1505). The display section 166 updates the display of the productivity management UI 1101 (S1506). That is, the display section 166 displays the productivity calculated in S1505 in the productivity change 1103, and reflects a difference between the productivity before elimination of the selected loss factor and the productivity after the elimination of the selected loss factor in the chart.

In the case where a different loss factor is newly selected (or in the case where a loss factor to be selected is added) (S1504: YES), S1505 and S1506 are executed.

In the case where the end of the display is specified from the manager (S1507: YES), the processing is ended.

In this processing, in S1502, for each loss factor, the productivity in the case where it is assumed that the loss factor is eliminated may be calculated. Subsequently, in the case where any loss factor is selected (S1504: YES), the calculated productivity in the case where it is assumed that the loss factor is eliminated may be displayed in S1506 without executing S1505.

In the above description, while the state combination is the combination of the states of 4 Ms, the state combination may also be a combination of states of any two or more Ms selected from 4 Ms. The above embodiment can be summarized, e.g., as described below.

The production management support system 100 includes the loss factor determination section 164 and the display section 166. The loss factor determination section 164 performs the loss factor determination which refers to, for each of two or more different Ms selected from 4 Ms (4 Ms in the above description), the time series data group (the 4-M time series table 400 in the above description) which represents the time series of the state of the element belonging to the M, and determines, for each period between time points, whether or not the state combination in the same period between time points corresponds to one or a plurality of the loss state combinations. The display section 166 displays the loss factor based on the result of the loss factor determination in chronological order. With this, even when it is not possible to determine the occurrence of the loss or the factor in the loss from the state of a single M, it is possible to determine the occurrence of the loss and the factor in the loss from the relationship between the state of the M and the state of another M. As a result, accuracy in the determination of the occurrence of the loss and the factor in the loss is improved.

The production management support system 100 may include the productivity calculation section 168. The productivity calculation section 168 may calculate a first productivity and a second productivity. The first productivity may be a productivity in the time block including the occurrence period of the loss. The second productivity may be a productivity in the same time block when it is assumed that the loss factor selected from two or more loss factors of two or more losses having occurred in the time block is eliminated. The display section 166 may display at least one of (A) and (B) described below.

(A) The calculated first productivity and the second productivity calculated for the selected loss factor.

(B) A difference between the first productivity and the second productivity of the selected loss factor.

With this, the user (e.g., the manager) can realize the degree of improvement of the productivity achieved by eliminating each loss factor and, by extension, determine the loss factor to be eliminated preferentially.

Instead of or in addition to calculating the second productivity for the selected loss factor, the productivity calculation section 168 may calculate the second productivity for each of two or more loss factors which have occurred in the target time block. In this case, the display section 166 may display the loss factor which is selected from the two or more loss factors and has the largest difference between the second productivity and the first productivity (for example, the display of the UI 1101 shown as an example in FIG. 12 may be the display proposed by the display section 166 (proposal of the highest-priority loss factor to be eliminated)). With this, the user can realize the loss factor to be eliminated preferentially without selecting the loss factor.

The display section 166 may identify one or more cameras which image-capture an area in which the element related to the selected loss factor is present. The selected loss factor may be a loss factor selected from one or two or more loss factors corresponding to one or two or more loss state combinations to which the state combination is determined to correspond. The display section 166 may determine, for each of the identified one or more cameras, the video which is represented by recorded video data which is data on the video (e.g., a file) recorded by the camera and corresponds to the occurrence time block of the loss of the selected loss factor to be the display target. The display section 166 may display one or more display-target videos corresponding to the one or more cameras. With this, the video which includes the occurrence time block of the selected loss factor and is highly likely to show the element related to the loss factor is expected to be provided to the user.

The display section 166 may identify, from among one or more videos corresponding to one or more cameras, the target video which is the video having the element belonging to the M of the type related to the selected loss factor as the image-capturing target. The display section 166 may display the target video as the video group 174 (one or more display-target videos), or may highlight the target video selected from the video group 174. With this, it is possible to facilitate the identification of the video to be noted by the user.

The display section 166 may identify the element belonging to the M of the type related to the selected loss factor in the video group 174, and may determine the identified element to be the element serving as the highlighting target. The display section 166 may highlight the element determined to be the highlighting target in the video group 174. With this, it is possible to facilitate the identification of a place to be noted in the video by the user.

In the loss factor determination, even when the state combination in a single period between time points corresponds to any loss state combination, in the case where it is impossible to determine the loss factor, the loss factor determination section 164 may determine whether or not the combination of the state combination in the single period between time points and the state combination in the period between time points immediately before or immediately after the single period between time points corresponds to the combination defined as the loss factor. With this, even when it is not possible to determine the loss factor from the state combination in the single period between time points, it is possible to determine the loss factor in the target period between time points from a difference between the state combination in the period between time points and the state combination in the period between time points immediately before or immediately after the period between time points.

In the loss factor determination, in the case where it is determined that any state combination corresponds to the state combination defined as any loss factor, the loss factor determination section 164 may determine, for the period between time points corresponding to the any state combination, the detail of the loss factor by referring to, among two or more time series data groups corresponding to two or more Ms described above, at least the time series data group corresponding to the M of the type related to the corresponding loss factor. The display section 166 may display the identified loss factor detail for the loss factor to be displayed. With this, the user can realize the detail of the loss factor in addition to the loss factor.

The two or more Ms described above may be 4 Ms. With this, a further improvement in accuracy in the determination of the occurrence of the loss and the factor in the loss is expected to be achieved.

The display section 166 may display a time series chart based on a first axis and a second axis. The first axis may be a time axis. The time series chart may have a loss object and two or more M objects corresponding to two or more Ms. The loss object may be a display object which represents the time series of the loss factor. For each of two or more Ms, the M object may be a display object which represents the state of the time series represented by the time series data group corresponding to the M. The loss object and the two or more M objects may extend along the first axis and may be arranged along the second axis. With this, the user easily grasps the time series of the loss factor, the time series of the state of each of two or more Ms, and the state combination of each loss factor.

While the embodiment has been described thus far, the embodiment merely represents an example for illustrating the present invention, and it is to be understood that the scope of the present invention is not limited only to the embodiment. The present invention can be implemented in various other modes.

What is claimed is:

1. A production management support system comprising:
   a memory storing:
   a loss factor rule table including a plurality of entries, each entry indicating a combination of respective states of two or more different Ms from among 4 Ms (Man, Machine, Material, and Method) and an associated loss factor that indicates an opportunity loss corresponding to the combination of respective states of the two or more Ms, and
   a time series table indicating respective states of each of the different Ms for each time period of a plurality of predetermined successive time periods;
   a processor configured to:
   for each time period of the plurality of predetermined successive time periods determine a state combination, which is a combination of respective states of two or more Ms in the time series table, that corresponds to an entry of the loss factor rule table, and obtain at least two loss factors respectively associated with at least two entries of the loss factor rule table;
   a display device displaying the obtained at least two loss factors in chronological order,
   wherein the display device displays one or more display-target videos,
   wherein the processor is configured to identify an element belonging to an M of a type relating to the selected loss factor in the one or more display-target videos and determine the identified element to be an element serving as a highlighting target, and
   wherein the display device highlights and displays the element determined to be the highlighting target in the one or more display-target videos.

2. The production management support system according to claim 1, wherein
   the processor calculates a first productivity which is a productivity in a time block including an occurrence period of an opportunity loss and a second productivity which is a productivity in the same time block on supposition that a loss factor selected from two or more loss factors in two or more opportunity losses having occurred in the time block is eliminated, and
   the display device displays at least one of (A) and (B) below,
   (A) the first productivity that is calculated and the second productivity that is calculated for the selected loss factor,
   (B) a difference in the selected loss factor between the second productivity and the first productivity.

3. The production management support system according to claim 1, wherein
   the processor calculates a first productivity which is a productivity in a time block including an occurrence period of an opportunity loss and a second productivity which is a productivity in the same time block on supposition that each of two or more loss factors in two or more opportunity losses having occurred in the time block is eliminated, and the display device displays the loss factor, which has a largest difference between the second productivity and the first productivity, from among the two or more loss factors.

4. The production management support system according to claim 1, wherein the processor is configured to identify one or more cameras which image-capture an area in which an element relating to a selected loss factor is present, the selected loss factor being a loss factor selected from the two or more obtained loss factors, the processor is configured to determine, for each of the identified one or more cameras, a video, which is represented by recorded video data which is data on a video recorded by the camera and corresponds to an occurrence time block of an opportunity loss of the selected loss factor, to be a display target.

5. The production management support system according to claim 4, wherein the processor identifies, from among one or more videos corresponding to the one or more cameras, a target video which is a video having an element, belonging to an M of a type related to the selected loss factor, as an image-capturing target, and the display device displays the target video as the one or more display-target videos, or highlights and displays the target video selected from the one or more display-target videos.

6. The production management support system according to claim 1, wherein the processor is configured to display on the display a time series chart based on a first axis and a second axis, the first axis is a time axis, wherein the time series chart has an opportunity loss object and two or more M objects corresponding to the two or more Ms, wherein the opportunity loss object is a display object representing a time series of a loss factor, wherein each M object is a display object representing, for each of the two or more Ms, a state of a time series represented by a time series data group corresponding to the M, and wherein the opportunity loss object and the two or more M objects extend along the first axis and are arranged along the second axis.

7. A production management support method comprising:
storing, by a memory:
a loss factor rule table including a plurality of entries, each entry indicating a combination of respective states of two or more different Ms from among 4 Ms (Man, Machine, Material, and Method) and an associated loss factor that indicates an opportunity loss corresponding to the combination of respective states of the two or more Ms, and a time series table indicating respective states of each of the different Ms for each time period of a plurality of predetermined successive time periods;

causing a computer to, for each time period of the successive predetermined time periods, determine a state combination, which is a combination of respective states of two or more Ms in the time series table, that corresponds to an entry of the loss factor rule table and obtain at least two loss factors respectively associated with at least two entries of the loss factor rule table;

causing the computer to display, on a display, the obtained at least two loss factors in chronological order;

displaying, by the display device, one or more display-target videos; and identifying, by the computer, an element belonging to an M of a type relating to the selected loss factor in the one or more display-target videos and determining the identified element to be an element serving as a highlighting target, wherein the display device highlights and displays the element determined to be the highlighting target in the one or more display-target videos.

8. A non-transitory computer readable medium storing a computer program causing a computer to execute:
storing, by a memory:
a loss factor rule table including a plurality of entries, each entry indicating a combination of respective states of two or more different Ms from among 4 Ms (Man, Machine, Material, and Method) and an associated loss factor that indicates an opportunity loss corresponding to the combination of respective states of the two or more Ms, and a time series table indicating respective states of each of the different Ms for each time period of a plurality of predetermined successive time periods;

for each time period of the successive predetermined time periods, determine a state combination, which is a combination of respective states of two or more Ms in the time series table, that corresponds to an entry of the loss factor rule table and obtain at least two loss factors respectively associated with at least two entries of the loss factor rule table;

displaying the obtained at least two loss factors in chronological order;

displaying, by the display device, one or more display-target videos; and identifying, by the computer, an element belonging to an M of a type relating to the selected loss factor in the one or more display-target videos and determining the identified element to be an element serving as a highlighting target, wherein the display device highlights and displays the element determined to be the highlighting target in the one or more display-target videos.

* * * * *